United States Patent
Arnone

(10) Patent No.: US 7,330,633 B2
(45) Date of Patent: Feb. 12, 2008

(54) THREE CONSTRAINT JOINT

(75) Inventor: David F Arnone, Mountain View, CA (US)

(73) Assignee: Bookham Technology plc, Northamptonshire (GB)

(*) Notice: Subject to any disclaimer, the term of this patent is extended or adjusted under 35 U.S.C. 154(b) by 161 days.

(21) Appl. No.: 10/993,058

(22) Filed: Nov. 18, 2004

(65) Prior Publication Data

US 2006/0104595 A1 May 18, 2006

(51) Int. Cl.
 G02B 6/00 (2006.01)
 G02B 7/02 (2006.01)
 G01B 11/26 (2006.01)
(52) U.S. Cl. .............. 385/147; 359/811; 359/819; 359/822; 356/138
(58) Field of Classification Search .......... 359/811, 359/819, 822; 356/138; 385/147
 See application file for complete search history.

(56) References Cited

U.S. PATENT DOCUMENTS

| | | | |
|---|---|---|---|
| 5,530,547 A * | 6/1996 | Arnold | 356/458 |
| 5,694,257 A | 12/1997 | Arnone et al. | |
| 5,953,164 A | 9/1999 | Arnone et al. | |
| 2002/0154865 A1* | 10/2002 | Lasecki et al. | 385/52 |
| 2004/0036987 A1* | 2/2004 | Wisecarver et al. | 359/819 |

FOREIGN PATENT DOCUMENTS

JP 60139189 1/1987

OTHER PUBLICATIONS

PCT International Search Report and PCT Written Opinion for PCT/US2005/040813 (This PCT application claims priority to the present application.).

* cited by examiner

*Primary Examiner*—Frank G. Font
*Assistant Examiner*—Jerry Martin Blevins
(74) *Attorney, Agent, or Firm*—Steven G. Roeder; James P. Broder

(57) ABSTRACT

A precision apparatus (10) includes a constraint joint (256) having a contact (258A) and a contact engager (258B). The contact (258A) includes a contact region (268) that is rounded, and the contact engager (258B) includes a first wall (270A), a second wall (270B), and a third wall (270C). Further, the walls (270A) (270B) (270C) are arranged so that the contact region (268) simultaneously contacts only one location on each wall (270A) (270B) (270C) to create a true three point contact that provides three degrees of constraint. One or more of the walls (270A), (270B), (270C) includes a contact pad (274) that engages the contact (258A). Each contact pad (274) can be made of a hard, relatively low friction material with a low friction surface (273).

25 Claims, 5 Drawing Sheets

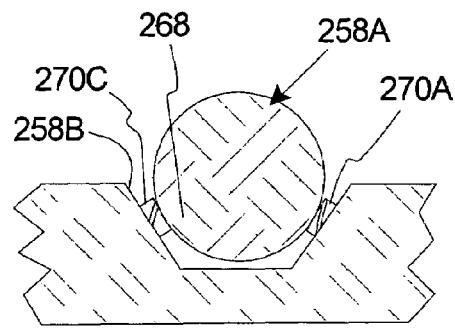
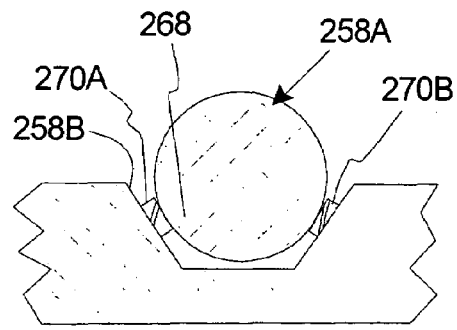
Fig. 2F    Fig. 2G
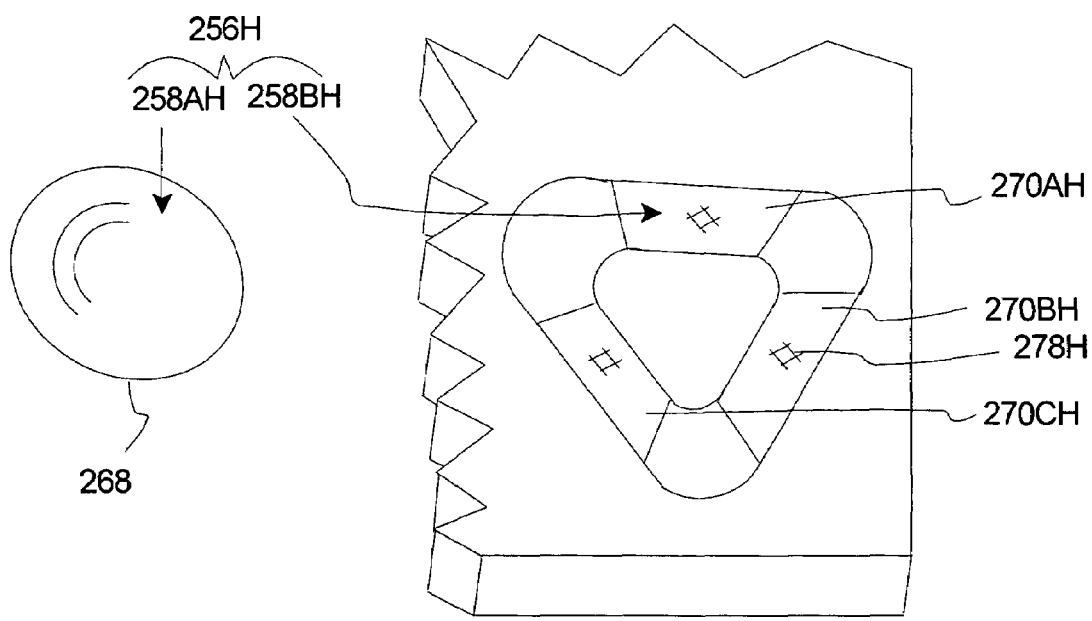
Fig. 2H

THREE CONSTRAINT JOINT

BACKGROUND

Optical adjusters are commonly used to make precise adjustments to the path of an optical beam. One type of optical adjuster includes a first frame, a second frame, an optical element secured to the second frame, and a mover assembly that moves and positions the second frame and the optical element relative to the first frame. Additionally, the optical adjuster can include one or more joints that maintain the frames apart and/or couples the mover assembly to one of the frames.

One type of joint used in optical assemblies is a ball type joint that provides three degrees of constraint. A typical three constraint ball type joint includes a spherical ball that is coupled to the first frame and a conical shaped ball receiver that is machined into the second frame. Unfortunately, this approach can result in a relatively high friction and high surface variability both part to part and over any one surface. Further, this approach can also suffer Hertzian stress failure of the underlying surfaces of the second frame, e.g. dents in the ball receiver. Additionally, this approach is not a true three point contact, but instead provides a circle of contact.

A second prior approach involves utilizing a formed, conical shaped, conical insert that is glued or otherwise attached to the ball receiver. This approach has good friction characteristics, but it does not provide a true three point contact. Additionally, this approach can be fairly expensive to manufacture.

SUMMARY

The present invention is directed to a precision apparatus including a joint having a contact and a contact engager. In one embodiment, the contact includes a contact region that is rounded, and the contact engager includes a first wall, a second wall, and a third wall. Further, the walls are arranged so that the contact region simultaneously contacts each wall at only one location in order to create a true three point contact that provides three degrees of constraint.

In one embodiment, the first wall is in a first plane, the second wall is in a second plane, and the third wall is in a third plane. Further, in this embodiment, the first plane intersects the second and third planes and the second plane intersects the first and third planes. Moreover, in one embodiment, the walls can converge from a proximal edge towards a distal edge of each wall. In an alternative embodiment, one or more of the walls can be curved.

In certain embodiments, one or more of the walls can include a low friction surface that contacts the contact region. For example, one or more of the walls can include a low friction pad that contacts the contact region. Alternatively, for example, one or more of the walls can include a low friction coating.

In certain embodiments, the present invention provides a substantially kinematic, low friction, three-constraint ball joint. This can result in a highly consistent and stable connection that allows for precise and easily repeatable engagement. Further, the joint can be relatively inexpensive to manufacture and assemble.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2F is a cut-away view taken on line 2F-2F in FIG. 2D;

FIG. 2G is a cut-away view taken on line 2G-2G in FIG. 2D;

FIG. 2H is an exploded, perspective view of another embodiment of a three constraint joint having features of the present invention;

DESCRIPTION

Figure 1:
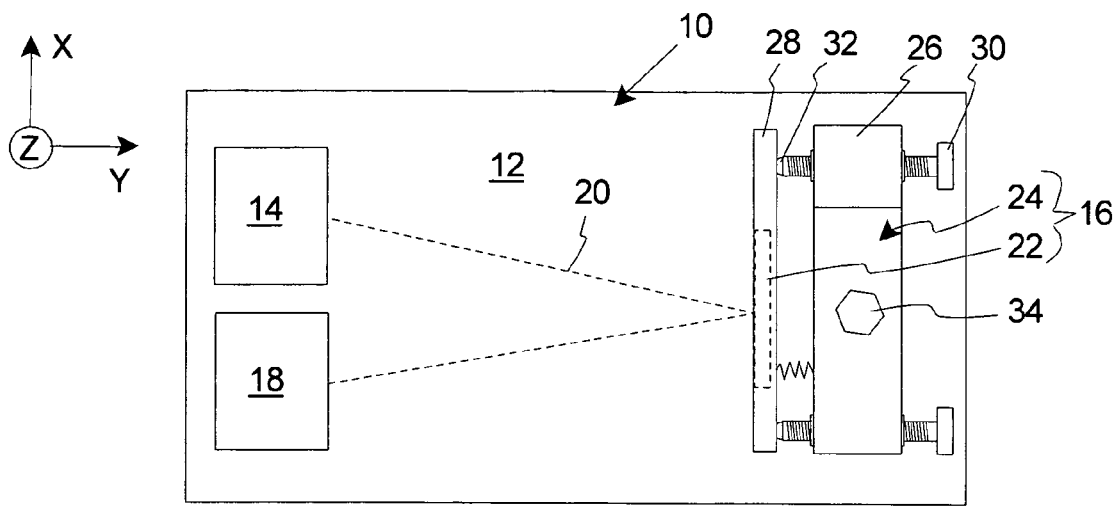
FIG. 1 is a simplified schematic illustration of a precision apparatus having features of the present invention.

Referring to FIG. 1, the present invention is directed to a precision apparatus 10 that, for example, can be used in manufacturing, technical or scientific instruments. As an example, the precision apparatus 10 can be a measurement system, e.g. a laser interferometer, encoder, and/or other measuring device. The design and orientation of the components of the precision apparatus 10 can be changed to suit the requirements of the precision apparatus 10. FIG. 1 is a simplified top view of one embodiment of the precision apparatus 10. In this embodiment, the precision apparatus 10 includes an apparatus frame 12, a beam source 14, an adjuster 16 and an object 18. However, one or more of these components can be optional.

FIG. 1 includes an orientation system that illustrates an X axis, a Y axis that is orthogonal to the X axis, and a Z axis that is orthogonal to the X and Y axes. It should be noted that these axes can also be referred to as the first, second, and third axes. In general, there are six degrees of freedom, including translation along the X, Y and Z axes and rotation about the X, Y and Z axes. As used herein, (i) one degree of constraint means constraining one of the six degrees of freedom, (ii) two degrees of constraint means constraining two of the six degrees of freedom, (iii) three degrees of constraint means constraining three of the six degrees of freedom, and (iv) six degrees of constraint means constraining all of the six degrees of freedom.

The apparatus frame 12 retains and/or supports the other components of the precision apparatus 10. In one embodiment, the apparatus frame 12 is made of a rigid material.

The beam source 14 generates a beam 20 of light energy that is directed at the adjuster 16. In one embodiment, the beam source 14 is a laser source and the beam 20 is a small diameter optical beam.

The adjuster 16 includes an element 22 (illustrated in phantom) that is precisely positioned. In one embodiment, the element 22 is an optical element, and the adjuster 16 includes a mount 24 that can be used for precise alignment of the element 22. In FIG. 1, the optical element 22 is a mirror. In this embodiment, the adjuster 16 is positioned in the path of the beam 20 and redirects the beam 20 at the object 18. Alternatively, for example, the optical element 22 can be an optical filter, an optical lens, a polarizer, a prism, an iris diaphragm, a filter wheel, a diode, a laser mount, a beam steerer, or another type of optical component.

Further, in FIG. 1, the optical mount 24 is used to precisely adjust the position of the optical element 22 to adjust the location at which the beam 20 engages the object 18. Alternatively, for example, the optical mount 24 can be positioned at another location in the precision apparatus 10. The design of the optical mount 24 can be varied to suit the design requirements of the precision apparatus 10. In the embodiment illustrated in FIG. 1, the optical mount 24 includes a first frame 26, a second frame 28, a mover assembly 30, and a joint assembly 32. In one embodiment, one of the frames 26, 28 is fixed to the apparatus frame 12 and the other frame 28, 26 retains the optical element 22. In FIG. 1, the first frame 26 is secured to the apparatus frame 12 with a fastener 34, e.g. a bolt, an adhesive or a clamp, and the second frame 28 retains the optical element 22.

The mover assembly 32 moves one of the frames 26, 28 relative to the other frame 28, 26. In FIG. 1, the mover assembly 32 moves the second frame 28 and the optical element 22 relative to the first frame 26 and the rest of the precision apparatus 10. With this design, the mover assembly 32 can be used to precisely adjust the position of the optical element 22.

The joint assembly 32 couples the frames 26, 28 together. In one embodiment, the mover assembly 30 is secured to the first frame 26 and the joint assembly 32 couples the mover assembly 30 to the second frame 28. Alternatively, for example, the joint assembly 32 can directly couple a portion of the first frame 26 to the second frame 28. Still alternatively, the mover assembly 30 can be secured to the second frame 28 and the joint assembly 32 can couple the mover assembly 30 to the first frame 26. In at least some of the embodiments provided herein, the joint assembly 32 provides a relatively low friction and highly consistent connection between the frames 26, 28 allows for precise and easily repeatable positioning of optical element 22.

As non-exclusive examples, the object 18 can be a mirror, lens, telescope, filter, emitter and/or detector.

Figure 2A:
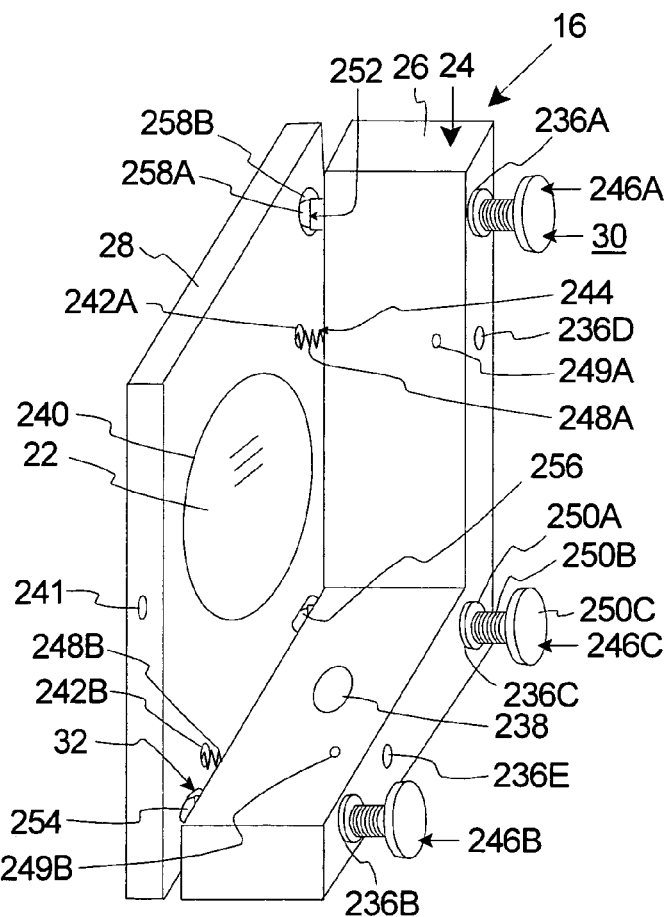
FIG. 2A is a perspective view of a first embodiment of an adjuster having features of the present invention.

FIG. 2A is a perspective view of a first embodiment of the adjuster 16 including the optical element 22 and the optical mount 24. In this embodiment, the optical mount 24 includes the first frame 26, the second frame 28, the mover assembly 30, and the joint assembly 32.

The size and shape of each frame 26, 28 can be varied to suit the requirements of the optical mount 24. For example, the first frame 26 can be generally plate shaped and can include (i) a first mover aperture 236A, (ii) a second mover aperture 236B that is spaced apart from the first mover aperture 236A, (iii) a third mover aperture 236C that is positioned between the first mover aperture 236A and the second mover aperture 236B, (iv) a first bias aperture 236D that is positioned between the first mover aperture 236A and the third mover aperture 236C, and (v) a second bias aperture 236E that is positioned between the second mover aperture 236B and the third mover aperture 236C. In FIG. 2A, the first frame 26 is generally "L" shaped. In one embodiment, each of the apertures 236A-236E receives a portion of the mover assembly 30. It should be noted that number of apertures 236A-236E can be increased or decreased depending upon the design of the mover assembly 30. For example, the first frame 26 could be designed without any apertures 236A-236E.

Additionally, the first frame 26 can include one or more mount apertures 238 that can be used to fasten the first frame 26 to the apparatus frame 12 (illustrated in FIG. 1). Moreover, in FIG. 2A, each of the legs of the first frame 26 is of substantially similar length so as to form a substantially symmetrical L-shaped first frame 26. Alternatively, the first frame 26 can have another configuration.

In FIG. 2A, the second frame 28 is generally flat plate shaped and includes an optical aperture 240 for receiving the optical element 22 and an element retainer 241, e.g. a set screw, that secures the optical element 22 to the second frame 28. Alternatively, the optical element 22 can be secured to the second frame 28 in another fashion. Additionally, in FIG. 2A, the second frame 28 includes a first bias aperture 242A and a spaced apart second bias aperture 242B that receives a portion of the mover assembly 30. It should be noted that number of apertures 242A, 242B can be increased or decreased depending upon the design of the mover assembly 30. For example, the second frame 28 could be designed without any apertures 242A, 242B.

The design of the mover assembly 30 can vary. For example, the mover assembly 30 can include one or more manual or electrically driven movers or actuators. In the embodiment illustrated in FIG. 2A, the mover assembly 30 includes a bias assembly 244, a first mover 246A, a second mover 246B, and a third mover 246C. In this embodiment, the movers 246A, 246B, 246C are spaced apart and arranged in an "L" shaped configuration. Alternatively, for example, the movers 246A, 246B, 246C can be arranged in a different configuration and/or the mover assembly 30 can include more than three or less than three movers.

The bias assembly 244 urges the second frame 28 towards the first frame 26 and against the movers 246A-246C. In FIG. 2A, the bias assembly 244 includes a first resilient member 248A and a spaced apart, second resilient member 248B. Further, in this embodiment, the first resilient member 248A includes (i) a first end that is positioned in the first bias aperture 236D of the first frame 26 and that is secured to the first frame 26 with a fastener 249A, and (ii) a second end that is positioned in the first bias aperture 242A of the second frame 28 and that is secured to the first frame 28 with a fastener (not shown). Similarly, in this embodiment, the second resilient member 248B includes (i) a first end that is positioned in the second bias aperture 236E of the first frame 26 and that is secured to the first frame 26 with a fastener 249B, and (ii) a second end that is positioned in the second bias aperture 242B of the second frame 28 and that is secured to the first frame 28 with a fastener. Each resilient member 248A, 248B, for example, can be a spring or a resilient band. Each fastener 249A, 249B can be a pin, a screw, an adhesive, a catch, or another type of retainer.

Alternatively, the number of resilient members 248A, 248B can be increased or decreased. Still alternatively, for example, the bias assembly 244 can include a magnetic type arrangement or another type of arrangement.

The design and operation of each mover 246A-246C can be altered depending upon the requirements of the precision apparatus 10. In FIG. 2A, each mover 246A-246C includes (i) an internally threaded insert 250A that fits into the respective mover aperture 236A, 236B, 236C and that is secured to the first frame 26, and (ii) an externally threaded screw 250B that fits into the threaded insert 250A and engages the threaded insert 250A. In one embodiment, the distal end of each screw 250B includes an optional knob 250C that can be engaged by the user to manually rotate each screw 250B. With this design, rotation of the screw 250B in one rotational direction causes the screw 250 to move in one direction relative to the first frame 26 and rotation of the screw 250B in the other rotational direction causes the screw 250 to move in the opposite direction relative to the first frame 26. Moreover, movement of one or more of the screws 250B causes movement of the second frame 28 and the optical element 22. Further, in FIG. 2A, the proximal end of each screw 250B retains a portion of the joint assembly 32.

Alternatively, for example, one or more of the screws 250B can be electrically rotated or the screws can be replaced with one or more linear actuators or a fixed ball arrangement.

The joint assembly 32 couples the first frame 26 to the second frame 28. In FIG. 2A, the joint assembly 32 couples the first frame 26 via the movers 246A-246C to the second frame 28. In one embodiment, the joint assembly 32 cooperates to substantially kinematically couple the movers 246A-246C to the second frame 28. This arrangement allows the movers 246A-246C to accurately and uniquely position the second frame 28 and the optical element 22. In one embodiment, the joint assembly 32 includes a one constraint joint 252, a two constraint joint 254, and a three constraint joint 256 that cooperate to provide six degrees of constraint. In FIG. 2A, the one constraint joint 252 provides one degree of constraint, the two constraint joint 254 provides two degrees of constraint, and the three constraint joint 256 provides three degrees of constraint.

In this embodiment, the constraint joints 252, 254, 256 are spaced apart and arranged in an "L" shaped configuration. Alternatively, for example, the constraint joints 252, 254, 256 can be arranged in a different configuration and/or the joint assembly 32 can include more than three or less than three joints.

In one embodiment, each constraint joint 252, 254, 256 is a ball type joint that includes a contact 258A and a contact engager 258B. In FIG. 2A, each contact 258A is secured to and partly fits into the proximal end of one of the screws 250B and each contact engager 258B is integrally formed into the second frame 28. Alternatively, for example, one or more of the contacts 258A can be integrally formed on the proximal end of one of the screws 250B and/or one or more of the contact engagers 258B can be a separate unit that is secured to the second frame 28. Still alternatively, one or more of the contacts 258A can be secured to and partly fit into the second frame 26 and one or more of the contact engagers 258B can be integrally formed into the proximal end of one of the screws 250B, or the first frame 26.

Figure 2B:
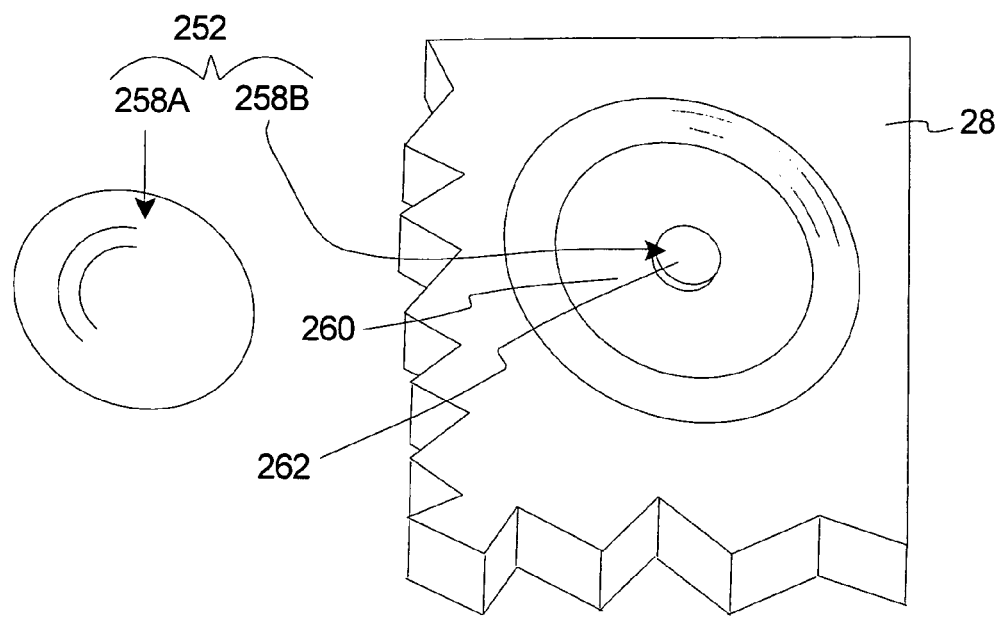
FIG. 2B is a detailed perspective view of a one constraint joint having features of the present invention.

FIG. 2B is a detailed perspective view of one embodiment of a one constraint joint 252 that can be used in the present invention. In this embodiment, for the one constraint joint 252, (i) the contact 258A is a spherical shaped ball that fits into the proximal end of the screw 250B (illustrated in FIG. 2A) of the first mover 246A (illustrated in FIG. 2A), and (ii) the contact engager 258B is a cut-out in the second frame 28 that defines a flat wall 260 that faces the contact 258A and engages the contact 258A. In FIG. 2B, the wall 260 is substantially parallel with the front of the second frame 28. With this design, the contact 258A contacts a single point of the contact engager 258B to provide one degree of constraint, e.g. along the Y axis (illustrated in FIG. 1). In one embodiment, the flat wall 260 of the contact engager 258B includes a contact pad 262 that engages the contact 258A. For example, the contact pad 262 can be disk shaped and can be made of a hard, relatively low friction material such as sapphire. Alternatively, for example, the flat wall 260 can be coated with a low friction material. Still alternatively, the one constraint joint 252 can have another design.

Figure 2C:
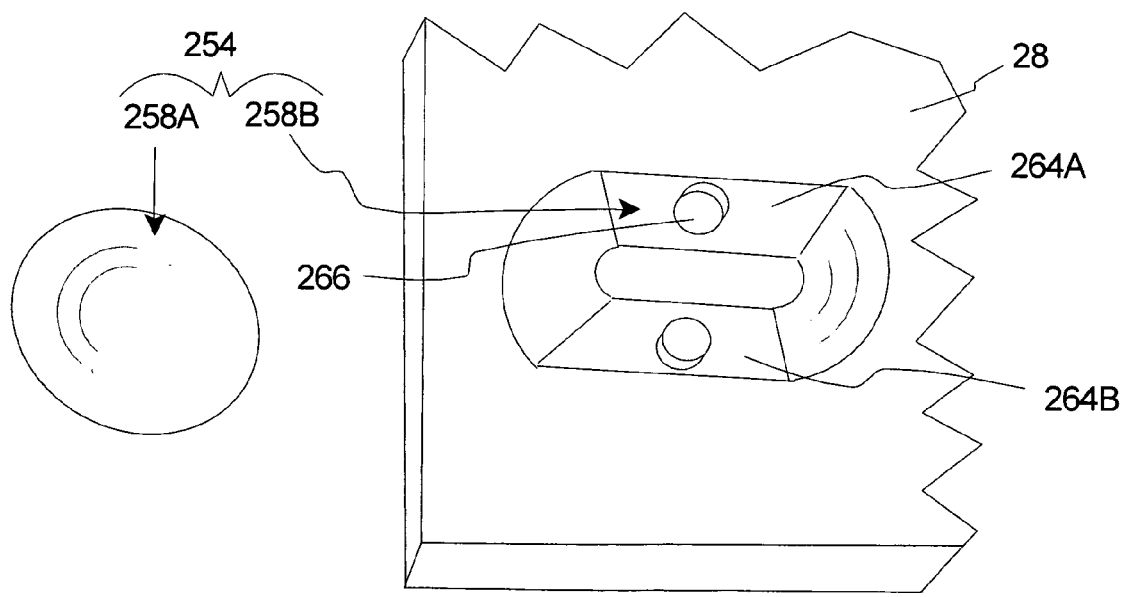
FIG. 2C is a detailed perspective view of a two constraint joint having features of the present invention.

FIG. 2C is a detailed perspective view of one embodiment of a two constraint joint 254 that can be used in the present invention. In this embodiment, for the two constraint joint 254, (i) the contact 258A is a spherical shaped ball that fits into the proximal end of the screw 250B (illustrated in FIG. 2A) of the second mover 246B (illustrated in FIG. 2A), and (ii) the contact engager 258B is a cut-out in the second frame 28 that defines a flat first wall 264A and a flat second wall 264B that engage the contact 258A. In FIG. 2C, the walls 264A, 264B are at an angle relative to the front of the second frame 28, the walls 264A, 264B are tapered towards each other, and the walls 264A, 264B form a "V" with a flat bottom. Alternatively, for example, one or both of the walls 264A, 264B can be curved and/or the bottom is not flat. With these designs, for the two constraint joint 254, the contact 258A contacts two points of the contact engager 258B to provide two degrees of constraint, e.g. along the Y axis and about the Z axis (illustrated in FIG. 1). In one embodiment, one or both of the walls 264A, 264B of the two constraint joint 254 includes a contact pad 266 that engages the contact 258A. For example, each contact pad 266 can be disk shaped and can be made of a hard, relatively low friction material such as sapphire. Alternatively, for example, one or both of the walls 264A, 264B can be coated with a low friction material. Still alternatively, the two constraint joint 254 can have another design.

Figure 2D:
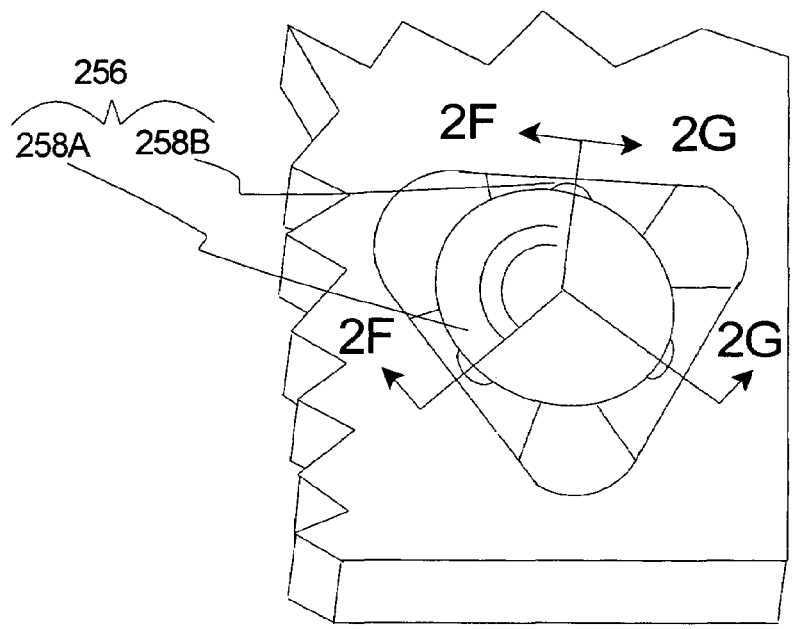
FIG. 2D is a perspective view of a three constraint joint having features of the present invention.

FIG. 2D is a perspective view of one embodiment of a three constraint joint 256 including the contact 258A and the contact engager 258B having features of the present invention.

Figure 2E:
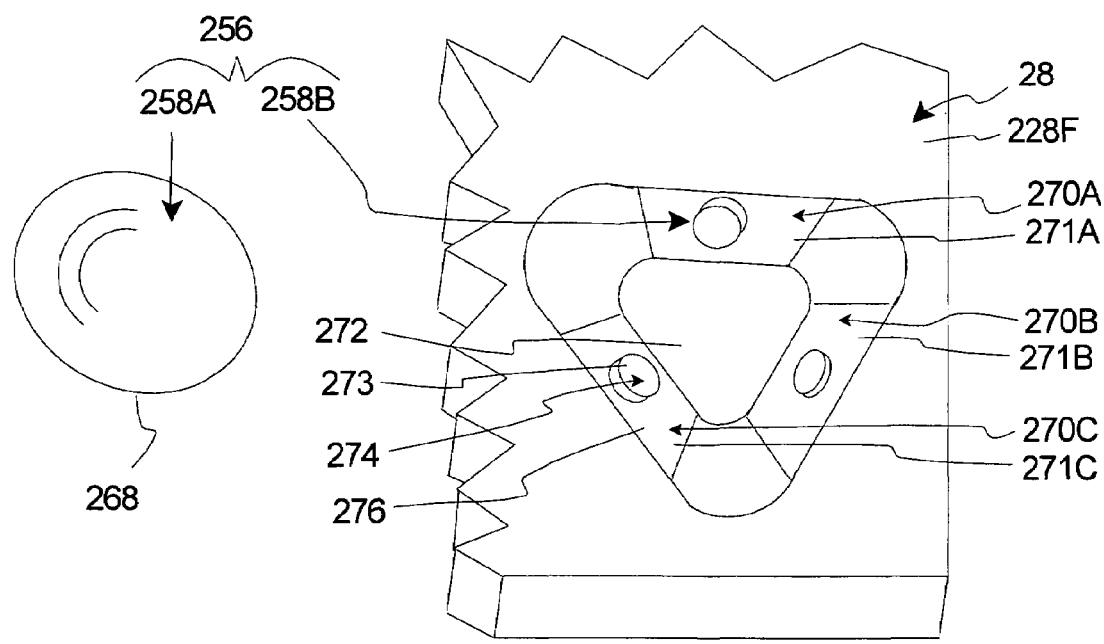
FIG. 2E is a detailed perspective view of the three constraint joint of FIG. 2D.

FIG. 2E is a detailed, perspective view of the three constraint joint 256 of FIG. 2D including the contact 258A and the contact engager 258B. In this embodiment, for the three constraint joint 256, the contact 258A includes a contact region 268 that engages the contact engager 258B. In one embodiment, the contact region 268 is rounded. For example, in FIG. 2E, the contact region 268 is semi-spherical, and the contact 258A is a spherical ball that partly fits into the proximal end of the screw 250B (illustrated in FIG. 2A) of the third mover 246C (illustrated in FIG. 2A) and partly fits into the contact engager 258B.

Additionally, in FIG. 2E, the contact engager 258B is a cut-out in the second frame 28 that defines a flat first wall 270A, a flat second wall 270B, and a flat third wall 270C that engage the contact 258A. In FIG. 2E, the walls 270A, 270B, 270C are at an angle relative to a front 228F of the second frame 28, the walls 270A, 270B, 270C are tapered towards each other, and the walls 270A, 270B, 270C are arranged in a somewhat triangular orientation with the corners of the "triangle" being somewhat rounded. In FIG. 2E, the first wall 270A is in a first plane 271A, the second wall 270B is in a second plane 271B, and the third wall 270C is in a third plane 271C, and the first plane 271A intersects the second and third planes 271B, 271C and the second plane 271B intersects the first and third planes 271A, 271C. Alternatively, for example, one or more of the walls 270A, 270B, 270C can be curved and/or the corners are not rounded.

Further, the second frame 28 further includes a base 272 and the walls 270A, 270B, 270C are angled inward toward the base 272 and each other so that the walls 270A, 270B, 270C are shorter adjacent to the base 272 than they are near the front 228F of the second frame 28. Moreover, in one embodiment, each of the walls 270A, 270B, 270C has substantially the same length, and/or the angle between the walls 270A, 270B, 270C is substantially the same. With this design, (i) at the front 228F of the second frame 28, the walls 270A, 270B, 270C form an equilateral triangle with rounded corners, and (ii) at the base 272, the walls 270A, 270B, 270C form an equilateral triangle with rounded corners that is smaller than the equilateral triangle formed at the front 228F.

Alternatively, for example, the second frame 28 does not include the base 272, and/or the walls 270A, 270B, 270C do not form an equilateral triangle with rounded corners.

In one embodiment, the walls 270A, 270B, 270C are arranged so that the contact region 268 simultaneously contacts each wall 270A, 270B, 270C at only one location. With this design, for the three constraint joint 256, the contact 258A contacts the contact engager 258B at only three points to provide three degrees of constraint, e.g. along the X, Y, and Z axes (illustrated in FIG. 1).

In one embodiment, one, two or three of the walls 270A, 270B, 270C of the three constraint joint 256 includes a contact surface 273. For example, one, two or three of the walls 270A, 270B, 270C of the three constraint joint 256 can include a contact pad 274 that engages the contact 258A. For example, each contact pad 274 can be flat disk shaped and can be made of a hard, relatively low friction material, such as sapphire. Alternatively, each contact pad 274 can be rectangular shaped or have another configuration. With these designs, the contact surface 273 is relatively low in friction. Further, each contact pad 274 can be secured to a wall body 276 of each of the walls 270A, 270B, 270C. Moreover, the three contact pads 274 are spaced apart and orientated in a somewhat triangular configuration. Additionally, or alternatively, for example, one, two, or three of the walls 270A, 270B, 270C can be coated with a low friction material or the contact pad 274 can have a different configuration.

In FIG. 2E, the contact surface 273 is generally flat. Alternatively, for example, the contact surface 273 can have another shape or configuration.

With this design, in certain embodiments, (i) the walls 270A, 270B, 270C allow for movement of the contact 258A relative to the walls 270A, 270B, 270C, (ii) the walls 270A, 270B, 270C provide a highly consistent surface finish, and/or (iii) the walls 270A, 270B, 270C provide a true three point contact.

FIGS. 2F and 2G are alternative cut-away views taken from FIG. 2D. FIGS. 2F and 2G collectively illustrate that the walls 270A, 270B, 270C of the contact engager 258B are arranged so that the contact region 268 of the contact 258A simultaneously contacts each wall 270A, 270B, 270C at only one location.

FIG. 2H is an exploded, perspective view of another embodiment of a three constraint joint 256H including the contact 258AH and the contact engager 258BH. In this embodiment, the contact 258AH is similar to the corresponding component described above. Further, the contact engager 258BH includes the first wall 270AH, the second wall 270BH, and the third wall 270CH that are somewhat similar to the corresponding component described above. However, in this embodiment, the walls 270AH, 270BH, 270CH do not include a contact pad. Instead, in this embodiment, one, two or three of the walls 270AH, 270BH, 270CH of the three constraint joint 256H includes a low friction coating 278H (illustrated in shading).

Figure 3A:
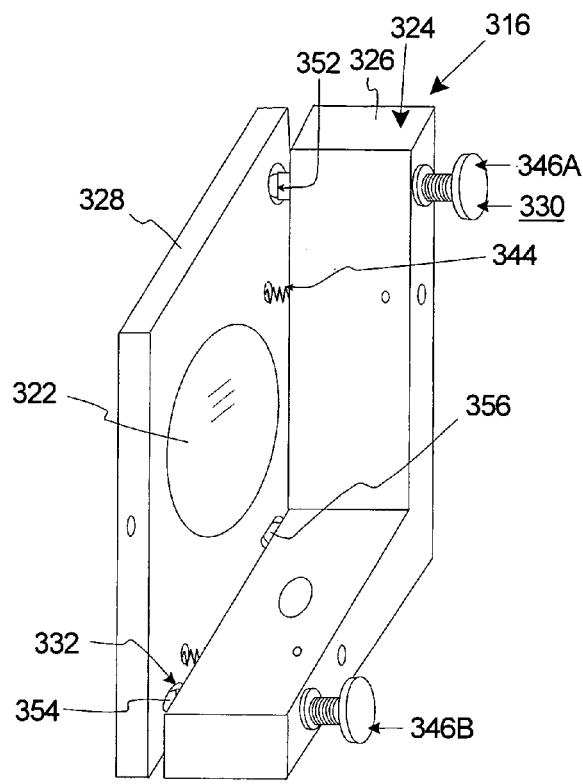
FIG. 3A is a perspective view of another embodiment of an adjuster having features of the present invention.

FIG. 3A is a perspective view of another embodiment of the adjuster 316 including the optical element 322 and the optical mount 324. In this embodiment, the optical element 322, the first frame 326, and the second frame 328 are somewhat similar to the corresponding embodiments described above. However, in this embodiment, the mover assembly 330 and the joint assembly 332 are slightly different.

More specifically, in FIG. 3A, the mover assembly 330 includes the bias assembly 344, the first mover 346A, and the second mover 346B and does not include a third mover. Further, the joint assembly 332 includes a one constraint joint 352, a two constraint joint 354, and a three constraint joint 356 that cooperate to provide six degrees of constraint. However, in FIG. 3A, the three constraint joint 356 is slightly different.

Figure 3B:
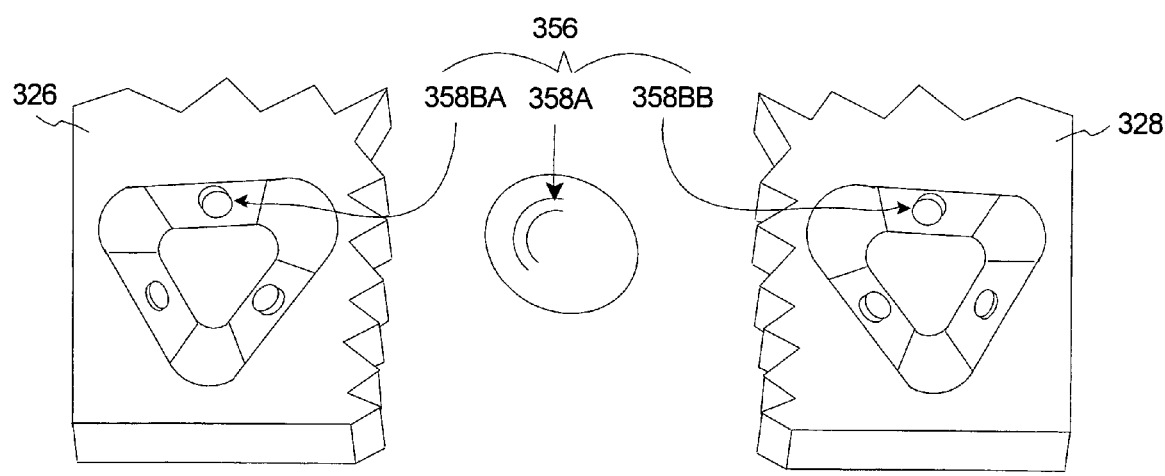
FIG. 3B is a detailed perspective view of still another embodiment of a three constraint joint having features of the present invention.

FIG. 3B is an exploded perspective view of the three constraint joint 356 of FIG. 3A. In this embodiment, the three constraint joint 356 includes a contact 358A, a first contact engager 358BA and a second contact engager 358BB. In this embodiment, the contact 358A is similar to the corresponding component described above. Further, the first contact engager 358BA and the second contact engager 358BB can be similar to contact engager 258B, 258BH described above. In this embodiment, the first contact engager 358BA is a cut-out in the first frame 326 and the second contact engager 358BB is a cut-out in the second frame 328. With this design, the three constraint joint 356 directly connects the first frame 326 to the second frame 328.

Although the present invention has been described in relation to its use with optical mounts, the Applicant does not intend for this invention to be limited to just such uses. Someone reasonably skilled in the use of kinematic three constraint joints should be able to equally apply the advancements comprised within the present invention to various other optical and mechanical assemblies.

What is claimed is:

1. A precision apparatus comprising:
a contact including a contact region that is rounded; and
a contact engager that includes a first wall, a second wall, and a third wall, the walls being arranged so that the contact region simultaneously contacts each wall at only one location; wherein the walls are arranged in a fashion that forms a portion of an inverted tetrahedron.

2. The precision apparatus of claim 1 wherein the first wall is in a first plane, the second wall is in a second plane, and the third wall is in a third plane, and wherein the first plane intersects the second and third planes and the second plane intersects the first and third planes.

3. The precision apparatus of claim 1 wherein the first wall, the second wall and the third wall are angled inward.

4. The precision apparatus of claim 1 wherein the contact region is semi-spherical.

5. The precision apparatus of claim 1 wherein the contact is spherical.

6. The precision apparatus of claim 1 wherein at least one of the walls includes a low friction surface.

7. The precision apparatus of claim 1 wherein each of the walls includes a low friction surface.

8. The precision apparatus of claim 1 wherein at least one of the walls includes a contact pad that contacts the contact region.

9. The precision apparatus of claim 8 wherein the pad includes a substantially flat, low friction surface.

10. The precision apparatus of claim 1 wherein each of the walls includes a contact pad that contacts the contact region.

11. The precision apparatus of claim 10 wherein each pad includes a substantially flat, low friction surface.

12. The precision apparatus of claim 1 further comprising a first frame that is coupled to the contact, a second frame that is coupled to the contact engager, and an optical element that is coupled to and moves with the second frame.

13. An adjuster comprising:
a first frame;
a second frame;
an element that is secured to one of the frames; and
a three constraint joint that maintains the first frame spaced apart from the second frame and provides three degrees of constraint, the three constraint joint including a contact and a contact engager, the contact being coupled to the first frame and having a contact region that is rounded, the second frame including the contact engager that has a first wall, a second wall, and a third wall, the walls being arranged so that the contact region simultaneously contacts each wall to provide three degrees of constraint; wherein the walls are arranged in a fashion that forms a portion of an inverted tetrahedron.

14. The adjuster of claim 13 wherein the contact engager is formed into the second frame.

15. The adjuster of claim 13 further comprising a mover that adjusts the relative position between the first frame and the second frame.

16. The adjuster of claim 15 wherein the contact is secured to the mover.

17. The adjuster of claim 13 further comprising a two constraint joint that couples the first frame to the second frame and provides two degrees of constraint of relative movement.

18. The adjuster of claim 13 further comprising a one constraint joint that couples the first frame to the second frame and provides one degree of constraint of relative movement.

19. The adjuster of claim 13 further comprising a bias assembly that urges the frames together.

20. A precision apparatus comprising the adjuster of claim 13 and a beam source that generates a beam that is directed at the element.

21. An adjuster comprising:
a first frame;
a second frame;
an optical element that is secured to one of the frames;
a mover assembly that adjusts the relative position of the frames;
a one constraint joint that couples the first frame to the second frame and provides one degree of constraint of relative movement;
a two constraint joint that couples the first frame to the second frame and provides two degrees of constraint of relative movement; and
a three constraint joint that maintains the first frame spaced apart from the second frame and provides three degrees of constraint, the three constraint joint including a contact and a contact engager, the contact being coupled to the first frame and having a contact region that is rounded, the second frame including the contact engager that has a first wall, a second wall, and a third wall, the walls being arranged so that the contact region simultaneously contacts each wall at only one location; wherein the walls are arranged in a fashion that forms a portion of an inverted tetrahedron.

22. A method for coupling a first frame to a second frame, the method comprising the steps of:
coupling a contact to one of the frames, the contact including a contact region that is rounded; and
coupling a contact engager to the other one of the frames, the contact engager including a first wall, a second wall, and a third wall, the walls being arranged so that the contact region simultaneously contacts each wall at only one location; wherein the walls are arranged in a fashion that forms a portion of an inverted tetrahedron.

23. The method of claim 22 further comprising the step of coupling the first frame to the second frame with a one constraint joint that provides one degree of constraint of relative movement.

24. The method of claim 22 further comprising the step of coupling the first frame to the second frame with a two constraint joint that provides two degrees of constraint of relative movement.

25. The method of claim 22 further comprising the step of urging the frames together with a bias assembly.

* * * * *